US009472080B1

United States Patent
Guo et al.

(10) Patent No.: US 9,472,080 B1
(45) Date of Patent: *Oct. 18, 2016

(54) RESPONDING TO A STATUS FOR A USER BASED ON NEARBY ELECTRONIC DEVICES

(71) Applicant: International Business Machines Corporation, Armonk, NY (US)

(72) Inventors: Jiaqing Guo, Shanghai (CN); Zhen Qi, Shanghai (CN); Qi Xi, Shanghai (CN); Xiao Feng Yu, Shanghai (CN); Ya Wen Zhao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,183

(22) Filed: Mar. 28, 2016

Related U.S. Application Data (63) Continuation of application No. 14/834,502, filed on Aug. 25, 2015.

(51) Int. Cl.
   *G08B 1/08* (2006.01)
   *G08B 21/02* (2006.01)

(52) U.S. Cl.
   CPC ..................... *G08B 21/02* (2013.01)

(58) Field of Classification Search
   None
   See application file for complete search history.

(56) References Cited

U.S. PATENT DOCUMENTS

| | | | | |
|---|---|---|---|---|
| 5,982,281 A | * | 11/1999 | Layson, Jr. | G07C 9/00103 340/539.13 |
| 6,847,295 B1 | * | 1/2005 | Taliaferro | G08B 21/0211 340/539.1 |
| 6,944,443 B2 | * | 9/2005 | Bates | H04W 4/02 340/903 |
| 7,106,191 B1 | * | 9/2006 | Liberati | G08B 21/0288 340/539.15 |
| 7,181,228 B2 | * | 2/2007 | Boesch | G01S 5/0027 340/539.15 |
| 7,987,277 B2 | | 7/2011 | Endo et al. | |
| 8,004,399 B2 | | 8/2011 | Reyes et al. | |
| 8,095,112 B2 | | 1/2012 | Chow | |

(Continued)

FOREIGN PATENT DOCUMENTS

| | | |
|---|---|---|
| CN | 102522044 A | 6/2012 |
| GB | 2474282 A | 4/2011 |

OTHER PUBLICATIONS

List of IBM Patents or Patent Applications Treated as Related, Appendix P, Filed Apr. 26, 2016.

(Continued)

*Primary Examiner* — Curtis King
(74) *Attorney, Agent, or Firm* — Daniel R. Simek (57) ABSTRACT

A method for determining a status of a user of an electronic device. The method includes a computer processor determining information associated with a first user of an electronic device. The method further includes identifying a plurality of electronic devices that are within a range of wireless communications to the electronic device. The method further includes defining an area monitored by the electronic device. The method further includes monitoring a group of the identified plurality of electronic devices that are within the defined area. The method further includes calculating a first safe-threshold value for the electronic device based on information associated with a first user of an electronic device and monitored information from the group of the identified plurality of electronic devices. The method further includes determining a status for the first user based, at least in part, on the calculated first safe-threshold value for the electronic device.

1 Claim, 4 Drawing Sheets

(56) References Cited

U.S. PATENT DOCUMENTS

| | | | |
|---|---|---|---|
| 8,116,748 B2 | 2/2012 | Aaron | |
| 8,583,077 B2 | 11/2013 | Yamashita | |
| 8,630,820 B2 | 1/2014 | Amis | |
| 2004/0004546 A1* | 1/2004 | Ando | E05B 45/06 340/541 |
| 2008/0094230 A1* | 4/2008 | Mock | G08B 1/08 340/573.4 |
| 2008/0132199 A1* | 6/2008 | Hirata | G08B 25/016 455/404.2 |
| 2009/0248292 A1* | 10/2009 | Adachi | G01C 21/26 701/533 |
| 2011/0309940 A1* | 12/2011 | Hyde | G08B 3/10 340/600 |
| 2013/0009777 A1* | 1/2013 | Aarts | G08B 21/0261 340/573.4 |
| 2013/0183924 A1* | 7/2013 | Saigh | H04W 4/025 455/404.2 |
| 2013/0214926 A1* | 8/2013 | Huang | G08B 21/24 340/539.13 |
| 2014/0145831 A1* | 5/2014 | Bassan-Eskenazi | G01S 11/02 340/10.4 |
| 2014/0300466 A1* | 10/2014 | Park | G08B 19/00 340/539.11 |

OTHER PUBLICATIONS

Guo, et al., "Responding to a Status for a User Based on Nearby Electronic Devices", U.S. Appl. No. 14/834,502, filed Aug. 25, 2015.

"Keep Your Family Safe with Life360 [iOS & Android]", Makeuseof, downloaded May 6, 2015, 3 pages, <http://www.makeuseof.com/tag/family-safe-life-360-ios-android/.

"Keep Your Family Safe with Life360 [iOS & Android]", Makeuseof, downloaded May 6, 2015, 3 pages, <http://www.makeuseof.com/tag/family-safe-life-360-ios-android/>.

* cited by examiner

RESPONDING TO A STATUS FOR A USER BASED ON NEARBY ELECTRONIC DEVICES

BACKGROUND OF THE INVENTION

The present invention relates generally to the field of security systems and personal safety, and more particularly to providing feedback to a user when the user exits a "safe" zone.

Technologies are available to provide location data through long-range data transmissions using global positioning system (GPS). Short-range and ultra-short-range transmissions, such as radio-frequency identification (RFID) and near field communications (NFC), can provide location data and communication over limited distances. Whereas other wireless technologies can span the distance ranges between GPS and NFC technologies. Wireless technologies can enable the detection, identification, location, and tracking of individuals, objects, vehicles, animals and items for many reasons. Some reasons to utilize this technology can include personal safety, security, private investigation, and inventory monitoring.

Developments in cellular and computing technology have resulted in proliferation of smart mobile electronic devices, such as smartphones, tablet computers, personal digital assistants (PDAs), fitness monitors, etc. Further advances in miniaturization and materials have produced wearable devices with advanced capabilities, such as digital eyeglasses (e.g., smart glasses) and smart watches. Mobile devices contribute to the growing network of social interactions and the connectedness of users. Advanced features incorporated into mobile devices include accelerometers, global positioning system (GPS) navigation, thermometers, altimeters, barometers, compasses, chronographs, near field communication (NFC), and radio-frequency identification (RFID).

As mobile devices become ubiquitous, these devices are as common to some users as a wallet/purse or a set of keys. Some mobile devices may be specialized for personal safety (e.g., child trackers, emergency beacons, etc.). Users of other mobile devices can download an application (app) that provides personal safety capacities.

SUMMARY

According to aspects of the present invention, there is a method, computer program product, and/or system for determining a status of a user of an electronic device. The method includes one or more computer processors determining information associated with a first user of an electronic device. The method further includes one or more computer processors identifying a plurality of electronic devices that are within a range of wireless communication to the electronic device. The method further includes one or more computer processors defining an area monitored by the electronic device. The method further includes one or more computer processors monitoring a group of the identified plurality of electronic devices that are within the defined area. The method further includes one or more computer processors calculating a first safe-threshold value for the electronic device based on information associated with a first user of an electronic device and monitored information from the group of the identified plurality of electronic devices. The method further includes one or more computer processors determining a status for the first user based, at least in part, on the calculated first safe-threshold value for the electronic device.

DETAILED DESCRIPTION

Embodiments of the present invention recognize that both indoors and outdoors, individuals may be in the presence of a plurality of electronics devices. Some electronic devices may be mobile (e.g., smartphones, tablet computers, personal fitness devices, personal safety devices, child monitors, etc.) and other electronic devices may be fixed (e.g., beacons, wireless hot-spots, communication towers, transceivers, etc.). Embodiments of the present invention utilize wireless communications to enable the invention; however, embodiments of the present invention are not restricted to electronic devices that include GPS capabilities. Some embodiments of the present invention can utilize GPS information. For example, if a wilderness area does not include trail beacons, an electronic device, among a group of electronic devices of a group of individuals, may utilize GPS mapping to determine when the group transit from an environment (e.g., area) to another environment and/or activity (e.g., kayaking as opposed hiking).

Embodiments of the present invention also recognize that the range and accuracy of position determination can vary based on the technology that is utilized by a wirelessly communicating electronic device. The range of various wireless technologies is identified by standards of the Institute of Electrical and Electronics Engineers (IEEE). For example, outdoors, the maximum range of an electronic device based on IEEE 802.11a is 5000 meters, and an electronic device based on IEEE 802.11g is 140 meters. In another example, indoors, the maximum range of an electronic device based on IEEE 802.11ac is 35 meters, and a device based on IEEE 802.11ad is a couple of meters. The accuracy for determining a distance (e.g., a position) to a wirelessly communicating electronic device is affected by the wireless technology utilized. For example, Bluetooth® Low Energy may be accurate within 10 centimeters as opposed to a wireless local area network (WLAN) that may be accurate to within 3 meters.

Embodiments of the present invention provide a method that utilizes the numerous electronic devices in and around a group of individuals that can communicate wirelessly, to improve the safety of one or more individuals of the group. The types of individuals that may be monitored for improved safety can include: an individual of a particular age, an individual with physical limitations, an individual unfamiliar with the language or nature of an area, or other individuals that can utilize embodiments of the present invention. Similarly, an embodiment of the present invention may be utilized to monitor and/or track pets or other animals. Some embodiments of the present invention include understanding the activities of an individual and the degree of familiarity (e.g., knowledge, skill level, etc.) that the individual has of an activity. An individual may participate in various outdoor activities; however, the knowledge and skill utilized to ride a bicycle as opposed to climbing a sheer cliff differ.

Some embodiments of the present invention eliminate a GPS requirement for a monitored electronic device, reducing the cost and the energy consumption of the monitored electronic device. In addition, by minimizing the reliance of an absolute positioning, the monitored electronic device may not need to be as sophisticated as other electronic devices in a group. Similarly, a monitored electronic device that does not include a screen to display the locations of identified electronic devices may be less expensive.

Embodiments of the present invention identify some or all of the numerous electronic devices in and around a group of individuals to define a "safe" zone for an electronic device of a monitored individual. In some embodiments of the present invention, an authentication process is utilized to identify an electronic device to a monitored electronic device. In other embodiments of the present invention, access to an identified device is not needed, thereby maintaining a level of privacy. To reduce false alarms (e.g., responses), embodiments of the present invention utilize weighting factors associated with each identified electronic device, which are applied when detecting the presence of an identified electronic device and calculating a safe threshold for the individual of the monitored electronic device. In some embodiments, additional weighting factors and/or constraints may be added when defining a monitored area or calculating a safe threshold. Some additional weighting factors and constraints may include: distance from an identified electronic device, number of identified electronic devices within a proximity of a monitored electronic device, detecting external inputs or messages (e.g., trail beacon information, weather reports, emergency signals, time of day, etc.). Other embodiments of the present invention reverse the roles of the electronic devices in a group. A guide may monitor the activities (e.g., determine safe thresholds) of multiple individuals that were assigned to the guide as part of the daily activities of the guide.

Embodiments of the present invention also incorporate predefined responses for a monitored electronic device that are associated with one or more safe thresholds or external inputs. In some embodiments, the predefined responses are input to a monitored electronic device via a user interface. In other embodiments, the predefined responses are download (e.g., wirelessly, a temporary wired connection, infrared communication, etc.) to the monitored electronic device from another electronic device. In some embodiments of the present invention, one or more predefined responses (e.g., actions) occur at the monitored electronic device. For example, a monitored electronic device may: vibrate, utilize an audio alarm, play a prerecorded message (e.g., a notification), display a text message, display a map with locations, play a text-to-speech message, etc. In other embodiments, a predefined electronic response may be communicated from a monitored electronic device to one or more of the identified electronic devices. In a further embodiment, additional predefined responses may be programmed into one or more identified electronics devices that respond to a communication from the monitored electronic device. For example, an identified electronic device relays a message to other electronic devices when the other electronic devices come into communication range. In another example, if a large group of individuals includes two or more monitored individuals and the monitored individuals separate when the larger group separates, new monitored areas are defined and new safe thresholds are determined.

The descriptions of the various scenarios, instances, and examples related to the present invention have been presented for purposes of illustration but are not intended to be exhaustive or limited to the embodiments disclosed.

Figure 1:
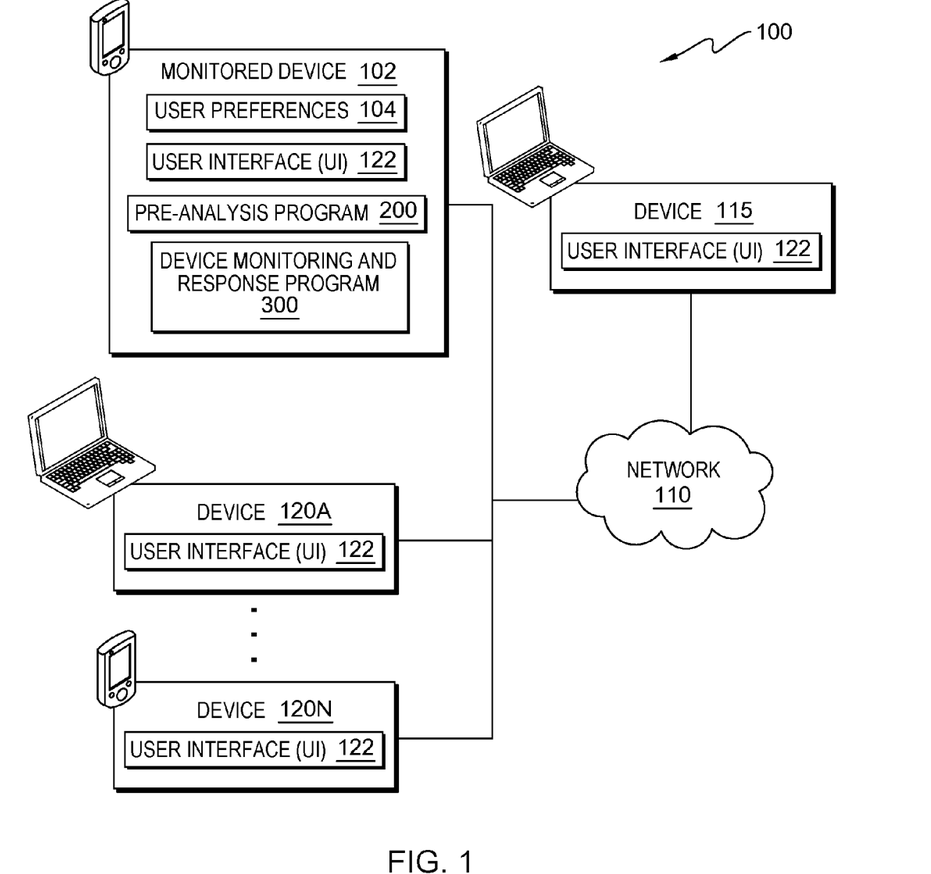
FIG. 1 illustrates a distributed computing environment, in accordance with an embodiment of the present invention.

The present invention will now be described in detail with reference to the Figures. FIG. 1 is a functional block diagram illustrating distributed computing environment 100 in an embodiment, in accordance with the present invention. An embodiment of distributed computing environment 100 includes monitored device 102, device 115, and devices 120A-120N, all interconnected over network 110. Many modifications to the depicted environment may be made by those skilled in the art without departing from the scope of the invention as recited by the claims.

Monitored device 102, device 115, and devices 120A-120N may be laptop computers, tablet computers, netbook computers, personal computers (PC), desktop computers, personal digital assistants (PDA), smart phones, wearable devices (e.g., digital eyeglasses, smart glasses, smart watches, personal fitness devices, personal safety devices), or any programmable computer systems known in the art. In certain embodiments, monitored device 102, device 115, and devices 120A-120N represent computer systems utilizing clustered computers and components (e.g., database server computers, application server computers, etc.) that act as a single pool of seamless resources when accessed through network 110, as is common in data centers and with cloud-computing applications. In general, monitored device 102, device 115, and devices 120A-120N are representative of any programmable electronic device or combination of programmable electronic devices capable of executing machine readable program instructions and communicating with users of monitored device 102, device 115, and devices 120A-120N, via network 110. Monitored device 102, device 115, and devices 120A-120N may include components, as depicted and described in further detail with respect to FIG. 4, in accordance with embodiments of the present invention.

Monitored device 102 includes user preferences 104, user interface (UI) 122, pre-analysis program 200, device monitoring and response program 300, and various programs and databases (e.g., a website interface, geo-locating software, speech recognition software, etc.) (not shown). In some embodiments, monitored device 102 includes hardware to monitor behaviors of a user and/or alerts a user. Examples of hardware, which monitored device 102 may include are: one or more physiological monitors (e.g., heart rate monitor), a speaker, a camera, a buzzer, accelerometers, a thermometer, an altimeter, a barometer, and a compass.

In one embodiment, user preferences 104 includes databases, one or more user profiles (e.g., demographic information, emergency contact information, medical information, weighting values, etc.), lists of user activities, skill levels (e.g., knowledge), pre-defined responses, log files of the activities of a user, and authentication information. In some embodiments, user preferences 104 is associated with monitored device 102 and one or more instances of devices 120A-120N. In an example, user preferences 104 may include authentication information (e.g., ID, password, etc.) to communicate responses from monitored device 102 and one or more instances of devices 120A-120N. In another example, user preferences 104 includes authentication information for monitored device 102 that permits a user of device 115 to input predefined responses to monitored device 102. User preferences 104 may include weighting factors that are applied to various instances of devices 120A-120N.

In a further embodiment, user preferences 104 may include logical operations and/or hierarchical organization of information (e.g., weighting factors, predefined responses, etc.). In one scenario, weighting factors may be biased by an environmental factor (e.g., weather). In an example, user preferences 104 may include a dictate that during adverse weather conditions the weighting factor for a child user is reduced to zero. In another scenario, user preferences 104 may include polling rates utilized by device monitoring and response program 300 that vary based on various criteria. In one example, user preferences 104 includes a polling rate modifier of 1.0 for instances of devices 120A-120N associated with an adult, and a polling rate modifier of 0.5 for instances of devices 120A-120N associated with a child. In another example, user preferences 104 includes a polling rate that is associated with one or more specific instances of devices 120A-120N. For example, monitored device 102 polls device 120A, 120C, 120E, and 120G at even ten-minute increments of the hour (e.g., 1:00, 1:10, 1:20, etc.); device 120B, 120D, 120F, and 120H at odd ten-minute increments of the hour (e.g., 1:05, 1:15, 1:25, etc.).

Other embodiments of the present invention are related to the safety and security on the information on monitored device 102 as well as a user of monitored device 102. In an alternate embodiment, user preferences 104 includes security information and security responses related to monitored device 102 as opposed to a user of monitored device 102. In an example, monitored device 102 is a computing device on loan to a user from a library or school. In another example, monitored device 102 and one or more instances of devices 120A-120N are included in a shipment of equipment (e.g., objects) to a tradeshow. User preferences 104 may include the IDs of the one or more instances of devices 120A-120N and predefined responses that are initiated if monitored device 102 is moved from the proximity of the one or more instances of devices 120A-120N within the shipment. For example, user preferences 104 may transmit an electronic warning message (e.g., notification) when monitored device 102 is determined to be in an unsafe location. A secondary response may be encrypting the information within monitored device 102 and password protection for monitored device 102.

In one embodiment, monitored device 102 communicates through network 110 to device 115 and devices 120A-120N. Network 110 can be, for example, a local area network (LAN), a telecommunications network, a WLAN, such as an intranet, a wide area network (WAN), such as the Internet, or any combination of the previous and can include wired, wireless, or fiber optic connections. In general, network 110 can be any combination of connections and protocols that will support communications between monitored device 102, device 115, and devices 120A-120N, in accordance with embodiments of the present invention. In another embodiment, network 110 operates locally via wired, wireless, or optical connections and can be any combination of connections and protocols (e.g., personal area network (PAN), near field communication (NFC), laser, infrared, ultrasonic, etc.).

In some embodiments, device monitoring and response program 300 utilizes network 110 to determine the location of instances of devices 120A-120N utilizing a wireless-based positioning system (WPS). The localization technique used for determining the position with wireless access points is based on measuring the intensity of the received signal (received signal strength or RSS) and the method of "fingerprinting." Some parameters useful to geo-locate an instance of devices 120A-120N include the service set identifier (SSID) and the media access control (MAC) address of an instance of devices 120A-120N. Another identifier that may be utilized by an instance of devices 120A-120N is a universally unique identifier (UUID). In one instance, the accuracy depends on the number of positions that have been entered into the location database (e.g., locations of beacons). Other systems that may be utilized to determine the locations for devices 120A-120N are indoor positioning systems (not shown). An indoor positioning system (IPS) is a solution to locate objects or people inside a building using radio waves, magnetic fields, acoustic signals, or other sensory information collected by device 115 and devices 120A-120N.

Devices 120A-120N may include an instance of user interface (UI) 122 and various programs (not shown). Examples of programs that devices 120A-120N include are: a web browser, an e-mail client, security software (e.g., a firewall program, a geo-locating program, an encryption program, etc.), an instant messaging (IM) application (app), and a communication (e.g., phone) application. A user of an instance of devices 120A-120N can interact with the respective UI 122 for the instance of devices 120A-120N via a singular interface device, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser) can generate UI 122 operating within the GUI of an instance of devices 120A-120N.

UI 122 accepts input from a plurality of input/output (I/O) devices including, but not limited to, a tactile sensor interface (e.g., a touch screen, a touchpad) or a natural user interface (e.g., voice control unit, motion capture device, etc.). An I/O device interfacing with a UI 122 may be connected to an instance of devices 120A-120N, which may operate utilizing wired (e.g., USB port) or wireless network communications (e.g., infrared, NFC, etc.). For example, an I/O device may be a peripheral, such as a keyboard, a mouse, a trackball, and a click wheel, that provides input from a user. A user may utilize UI 122 interface screen generated by pre-analysis program 200.

Pre-analysis program 200 utilizes information associated with a user, information related to an activity of the user, and the identities of a plurality of other devices to define an area that is monitored by monitored device 102 of a user. In addition, pre-analysis program 200 communicates the information associated with a user and an activity of a user and the identities of a plurality of other devices to device monitoring and response program 300. In addition, pre-analysis program 200 responds to changes in the activity of a user of monitored device 102.

Device monitoring and response program 300 utilizes information obtained from pre-analysis program 200 to set a polling rate that monitored device 102 utilizes to identify which identified electronic devices (e.g., device 115, devices 120A-120N) are within a monitored area determined by pre-analysis program 200. Device monitoring and response program 300 applies one or more weighting factors to the identified electronic devices within a monitored area to calculate a safe threshold for monitored device 102.

Device monitoring and response program 300 also utilizes the safe threshold calculated for monitored device 102 to determine which, if any, predefined responses within user preferences 104 initiate. Subsequently, device monitoring and response program 300 communicates a response to pre-analysis program 200. In some instances, the safe-threshold value calculated by device monitoring and response program 300 does not initiate a response (e.g., a null response.)

Figure 2:
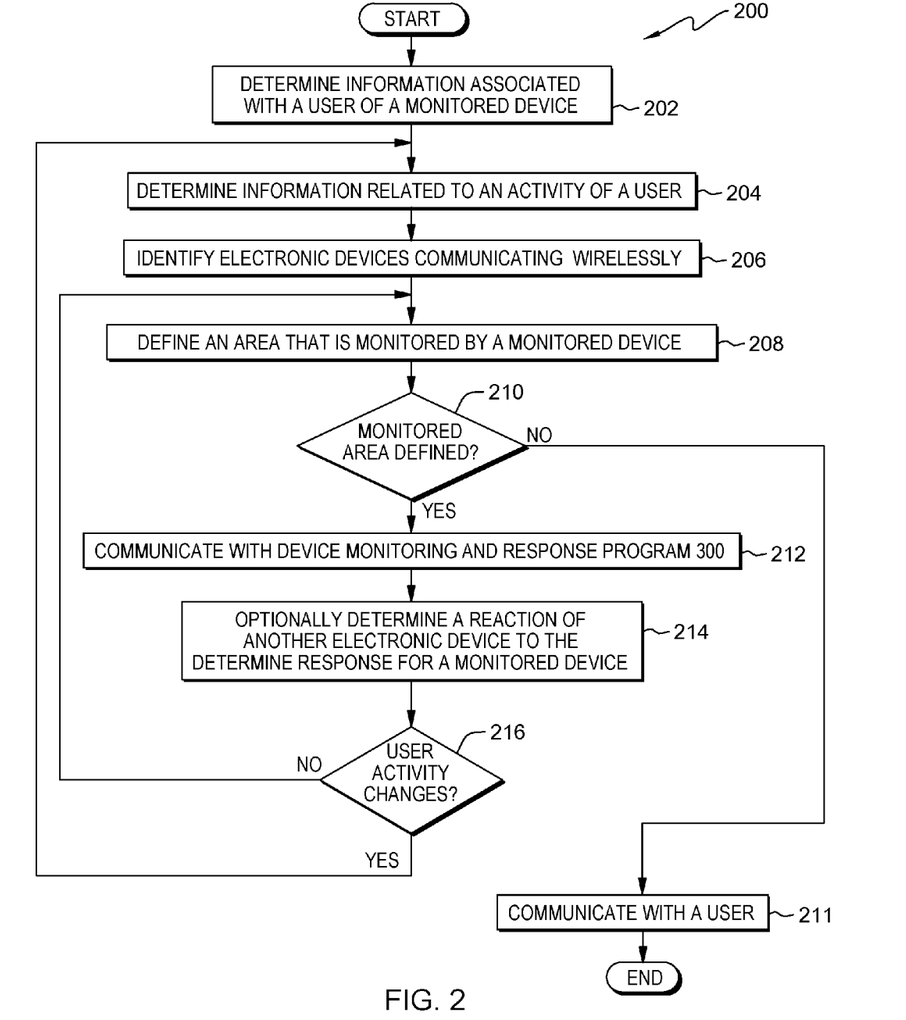
FIG. 2 depicts a flowchart of the operational steps of a pre-analysis program, in accordance with an embodiment of the present invention.

FIG. 2 is a flowchart depicting operational steps for pre-analysis program 200, a program for configuring a device of a user based on information associated with a user and information related to an activity of a user. Pre-analysis program 200 identifies devices of other users and determines a monitored area for monitored device 102 of a user. In addition, pre-analysis program 200 may determine a reaction of one or more devices of other users to a response of monitored device 102 of a user, in accordance with embodiments of the present invention.

In step 202, pre-analysis program 200 determines information associated with the user of a device. Pre-analysis program 200 may utilize information associated with a user that includes: personal information, medical information, emergency contact information, pre-defined responses, one or more parameters defining a monitored area, etc. In addition, pre-analysis program 200 may utilize other information associated with a user that includes: a minimum number of devices within a monitored area, weighting factors for the devices and/or users, and mapping information. In an example, pre-analysis program 200 determines that user preferences 104 assign a weighting factor of 2.5 for device 115, instances of devices 120A-120N that are associated with adult users a weighting factor of 2.0, geo-fencing beacons a weighting factor of 1.0, and child users a weighting factor of 0.5.

In one embodiment, pre-analysis program 200 utilizes information in user preferences 104 to determine information associated with the user of monitored device 102. In one scenario, pre-analysis program 200 determines that monitored device 102 is configured for a single user and determines the information associated with the user based on user preferences 104. In another scenario, pre-analysis program 200 determines that user preferences 104 of monitored device 102 contains information that is associated with two or more users. Pre-analysis program 200 activates UI 122 of monitored device 102 to obtain an indication as to which user currently utilizes monitored device 102.

In another embodiment, pre-analysis program 200 activates UI 122 to obtain information associated with a user of monitored device 102. In one scenario, pre-analysis program 200 may obtain information associated with the user of monitored device 102 via UI 122 executing on monitored device 102. In another scenario, pre-analysis program 200 may obtain information associated with the user of monitored device 102 via UI 122 executing on device 115. In an example, monitored device 102 is a tracking device for a child. An adult utilizes UI 122 of device 115 to communicate the information and user preferences to user preferences 104 related to a child utilizing monitored device 102. For example, pre-analysis program 200 determines that a user preference for the child includes multiple monitored area criteria: 15 meters for a playground area, 5 meters for a nature trail, and 20 meters within a museum.

In an alternate embodiment, pre-analysis program 200 determines that monitored device 102 is not associated with a human user. Pre-analysis program 200 subsequently determines information related to monitored device 102 and the operation of monitored device 102. In an example, pre-analysis program 200 determines that monitored device 102 is a tablet computer that is a shareable device within a library. In another example, pre-analysis program 200 determines that monitored device 102 is a smart object (e.g., a powered RFID tag, a powered security device, etc.) that is included within and/or on: another computing device, a transport container, or a vehicle.

In step 204, pre-analysis program 200 determines information related to an activity of a user. In an embodiment, pre-analysis program 200 activates UI 122 to obtain information related to an activity of a user of monitored device 102. In one scenario, pre-analysis program 200 may obtain information related to an activity of a user of monitored device 102 via UI 122 executing on monitored device 102. In another scenario, pre-analysis program 200 may obtain information related to an activity of a user of monitored device 102 via UI 122 executing on device 115. In some embodiments, pre-analysis program 200 utilizes information associated with the user preferences that includes knowledge-based and/or skill-based rankings for various activities. In one example, pre-analysis program 200 determines from an input itinerary for a user of monitored device 102 that the user plans to engage in hiking, kayaking, and rock-climbing. Information stored in user preferences 104 indicates that the user of monitored device 102 is relatively highly skilled at hiking and kayaking, and pre-analysis program 200 determines that the user of monitored device 102 has a 70 meter radius area with a minimum of two other user devices (e.g., device 120B and device 120D) within the monitored area. However, pre-analysis program 200 determines that the user of monitored device 102 is a novice rock climber and subsequently constrains the monitored area for rock climbing to 10 meters and a minimum of four other user devices (e.g., devices 120E, 120F, 120G, and 120H) within the monitored area.

In step 206, pre-analysis program 200 identifies electronic devices communicating wirelessly. In one embodiment, pre-analysis program 200 identifies one or more electronic devices (e.g., devices 120A-120N) of other users that are within a wireless communication range of monitored device 102. In some scenarios, pre-analysis program 200 determines a group of identified electronic devices (e.g., devices 120C-K) that are monitored as opposed to the plurality of electronic devices (e.g., devices 120A-120N) detected by monitored device 102. In one scenario, pre-analysis program 200 utilizes a wireless communication program (not shown), such as a scanning program, to detect and identify another electronic device and a communication method utilized by the other electronic device (e.g., an instance of devices 120A-120N). In one instance, the identity of the other electronic device may be an ID defined by a user of the other electronic device. For example, device 120D may have the ID "smartphone_948." In another instance, the identity of the other electronic device may be related to the communication electronics of the other electronic device. For example, an electronic device may be identified by a MAC address or a UUID. In an example, pre-analysis program 200 may identify one or more electronic devices (e.g., device 120K and device 120L) that include GPS and wireless telephony capabilities to monitored device 102 as one category of devices with respect to reacting to responses from monitored device 102. In another scenario, pre-analysis program 200 may identify other instances of devices 120A-120N that include short-range wireless communication capability (e.g., fitness monitors) as a second category, and pre-analysis program 200 may identify still other instances of devices 120A-120N that are beacons as in a third category.

In some embodiments, pre-analysis program 200 may initiate an authentication protocol to obtain additional information that is included with identifying an instance of devices 120A-120N. In an example, pre-analysis program 200 may identify (e.g., detect) device 120K. However, prior to pre-analysis program 200 authenticating with device 120K, pre-analysis program 200 cannot obtain information (e.g., skill level of a user for an activity, demographic information needed to determine a weighting factor, capabilities for device 120K, etc.) for a user of device 120K. In another embodiment, pre-analysis program 200 may identify other electronic devices that are within an area dictated by one or more user preferences. In an example, device 115 is utilized by a tour guide, and pre-analysis program 200 determines that devices 120A-120N are instances of monitored device 102 and that device 115 monitors as opposed to monitored device 102 executing the monitoring aspect of the present invention.

In a further embodiment, pre-analysis program 200 identifies one or more electronic devices (e.g., devices 120K-120M) that are not utilized by a human user. In one example, pre-analysis program 200 may identify one or more smart objects that may wirelessly communicate. In another example, pre-analysis program 200 may identify one or more vehicles that may wirelessly communicate.

In step 208, pre-analysis program 200 defines an area that is monitored by a monitored device. In one embodiment, pre-analysis program 200 determines that the defined area that is monitored by monitored device 102 is based on one or more user preferences and/or information related to an activity of the user. In another embodiment, pre-analysis program 200 may dictate (i.e., define) an area that is monitored based on one or more user preferences and the number of electronic devices within a group of electronic devices (e.g., devices 120A-120N) that are identified from a plurality of electronic devices within a proximity of monitored device 102.

In decision step 210, pre-analysis program 200 determines whether a monitored area is defined for a monitored device. In some embodiments, pre-analysis program 200 determines whether sufficient instances of other electronic devices (e.g., devices 120A-120N) are present within an area defined by one or more user preferences (e.g., user preferences 104) and/or information related to an activity of a user of monitored device 102 to define a monitored area for monitored device 102. In other embodiments, pre-analysis program 200 dictates (i.e., defines) a monitored area based on one or more user preferences and the other electronic devices (e.g., devices 120A-120N) that are identified to monitored device 102.

In decision step 210, responsive to determining that a monitored area cannot be defined (no branch, decision step 210), pre-analysis program 200 communicates with a user (step 211).

In step 211, pre-analysis program 200 communicates with a user. In one embodiment, pre-analysis program 200 communicates with a user of monitored device 102 that a monitored area was not defined based on one or more user preferences within user preferences 104. In one scenario, pre-analysis program 200 may communicate with the user of monitored device 102 that there are insufficient instances of other electronic devices (e.g., devices 120A-120N) to define a monitored area. In another scenario, pre-analysis program 200 may communicate with the user of monitored device 102 that the number of users of the other electronic devices (e.g., devices 120A-120N) has decreased below the number of other electronic devices dictated to define a monitored area.

In another embodiment, pre-analysis program 200 communicates with a user of device 115 that a monitored area was not defined based on one or more user preferences within user preferences 104. In one scenario, pre-analysis program 200 may communicate with the user of device 115 that insufficient instances of electronic devices (e.g., devices 120A-120N) wirelessly communicate with monitored device 102 to define a monitored area. In another scenario, pre-analysis program 200 may communicate with the user of device 115 that the number of electronic devices (e.g., devices 120A-120N) within an identified group of wirelessly communicating electronic devices has decreased below the number of electronic devices dictated to define a monitored area. In an example, pre-analysis program 200 determines that sufficient individuals that include identified electronic devices have split from the main tour group to maintain a defined area of a twenty meter radius. However, pre-analysis program 200 may inform the user of device 115 that sufficient electronic devices exist to define a ten meter radius monitored area for monitored device 102. Subsequently, another instance of pre-analysis program 200 may execute after a user preference 104 is updated defining a monitored area of a ten meter radius for monitored device 102.

Referring to decision step 210, responsive to determining that a monitored area is defined (yes branch, decision step 210), pre-analysis program 200 communicates with device monitoring and response program 300 (step 212).

In step 212, pre-analysis program 200 communicates with device monitoring and response program 300. In one embodiment, pre-analysis program 200 communicates information associated with monitored device 102 and a user of monitored device 102 (e.g., user preferences 104) to device monitoring and response program 300. The communicated information may include: information of a user, information of monitored device 102, an activity of a user, information of a monitored area, one or more user preferences, and information of one or more instances of devices 120A-120N within a monitored area. In another embodiment, pre-analysis program 200 receives communications from device monitoring and response program 300, which may include one or more responses initiated by monitored device 102, information associated with monitored device 102, information associated with the area monitored by monitored device 102, and one or more responses that may be initiated by device 115 and devices 120A-120N.

In step 214, pre-analysis program 200 optionally determines a reaction of another electronic device to a determined response for a monitored device. In one embodiment, pre-analysis program 200 may determine that one or more instances of an electronic device (e.g., devices 120A-120N) reacts to a response of monitored device 102. In an example, pre-analysis program 200 detects a message and/or notification (e.g., text, voice, graphical, etc.) that is sent to a user of monitored device 102 from device 120G. In another example, pre-analysis program 200 determines that a predefined action (e.g., a device vibrates, produces a tone, displays a message) occurs on one or more instances of devices 120A-120N. In another embodiment, pre-analysis program 200 may determine that a user of device 115 reacts to a response of monitored device 102. In an example, pre-analysis program 200 determines that a user of device 115 transmits a map to monitored device 102. In addition to the map, pre-analysis program 200 may determine that the user of device 115 deploys a personal tracking drone with a beacon that identifies a location on the transmitted map.

In decision step 216, pre-analysis program 200 determines whether the activity of a user changes. In one embodiment, pre-analysis program 200 utilizes one or more inputs to UI 122 to determine that a change occurs to an activity for a user of monitored device 102. In another embodiment, pre-analysis program 200 utilizes one or more inputs external to the user of monitored device 102 to determine that a change occurs to an activity for the user of monitored device 102. In one scenario, pre-analysis program 200 may receive input from another instance of UI 122 executing on one or more other devices (e.g., device 115, devices 120A-120N). In an example, pre-analysis program 200 receives an input indicating a change in activity for a child utilizing monitored device 102 from a parent utilizing UI 122 on device 115. In another scenario, pre-analysis program 200 may receive input from a beacon that a user of monitored device 102 transitions from one area (e.g., zone, building, vehicle) to a different area. For example, pre-analysis program 200 determines that a change in activity occurs when a user of monitored device 102 transitions from a ski slope of one difficulty to a ski slope of a different difficulty.

In a further embodiment, pre-analysis program 200 may determine that a change in an activity of a user occurs when a change occurs to the environment of the activity of the user of monitored device 102. In a scenario, pre-analysis program 200 determines that a user preference relates to weather condition. When monitored device 102 detects a change in the weather and/or receives a weather alert, pre-analysis program 200 determines that a change occurs in the activity of a user of monitored device 102. In an example, pre-analysis program 200 determines that a severe storm warning is issued and responds to the change in the weather. In another scenario, pre-analysis program 200 determines that a change to an activity occurs based on received input. In an example, pre-analysis program 200 determines that a change in activity occurs based on a broadcast message, for example, "The museum is closing in 15 minutes."

In decision step 216, responsive to determining that a user of monitored device 102 does not change an activity (no branch, decision step 216), pre-analysis program 200 loops to determine an area that is monitored by monitored device 102 (step 208). In one embodiment, pre-analysis program 200 may utilize communicated information (step 212) related to one or more responses determined by device monitoring and response program 300 that affects the monitored area. In an example, pre-analysis program 200 received an indication that a user of monitored device 102 is not within a safe threshold based on one or more users of instances of devices 120A-120N are not active, reducing the number of instances of devices 120A-120N below the minimum value dictated for a previously determined monitored area. In another embodiment, pre-analysis program 200 may determine that a reaction by one or more users of instances of devices 120A-120N to the determined response (step 214) affects the monitored (e.g., defined) area of monitored device 102.

Referring to decision step 216, responsive to determining that a user of monitored device 102 changes an activity (yes branch, decision step 216), pre-analysis program 200 loops to determine information related to the changed activity (step 204).

Figure 3:
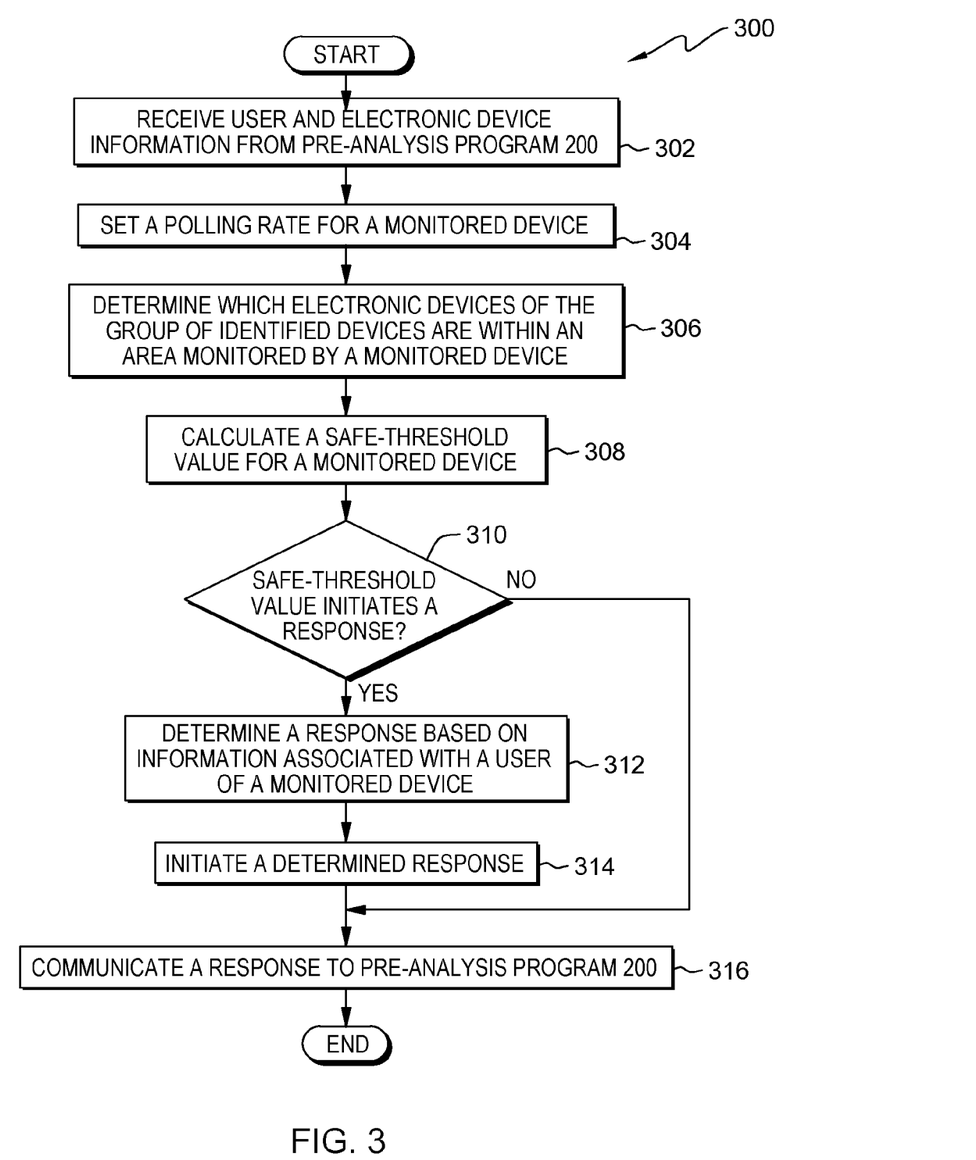
FIG. 3 depicts a flowchart of the operational steps of a device monitoring and response program, in accordance with an embodiment of the present invention.

FIG. 3 is a flowchart depicting operational steps for device monitoring and response program 300, a program for determining whether a monitored device of a user is within a safe zone based on calculating a safe threshold for the user and initiating one or more predefined responses when a safe threshold for the user is not met.

In step 302, device monitoring and response program 300 receives user and electronic device information from pre-analysis program 200. In one embodiment, device monitoring and response program 300 receives information associated with monitored device 102 and a user of monitored device 102. Information associated with the user of monitored device 102 may include information from user preferences 104, manually input information input from UI 122, information input to another device (e.g., device 115), information related to an activity of a user, and predefined responses. Information associated with monitored device 102 may include: specifications and/or capabilities of monitored device 102, a group of electronic devices (e.g., device 115, devices 120A-120N) within wireless communication range identified to monitored device 102, information associated with the users of the identified electronic devices, and an area monitored by monitored device 102.

In another embodiment, device monitoring and response program 300 queries the identified group of electronic devices (e.g., device 115, devices 120A-120N) to determine information associated with the electronic devices and users of the electronic devices. In an example, device monitoring and response program 300 may determine the specifications and/or capabilities (e.g., GPS mapping software, Internet connectivity, an IM service, etc.) of the electronic devices (e.g., device 115, devices 120A-120N) identified to monitored device 102. In some embodiments, an electronic device (e.g., device 120E) may dictate that device monitoring and response program 300 utilize an authentication protocol in order to obtain the specifications and/or capabilities of the electronic device (e.g., device 120E).

In step 304, device monitoring and response program 300 sets a polling rate for a monitored device. Device monitoring and response program 300 sets a polling rate for monitored device 102 to communicate with and/or detect the presence of the electronic devices of a group of identified electronic devices (referencing FIG. 2, step 206). In one embodiment, device monitoring and response program 300 sets a polling rate for monitored device 102 based on one or more user preferences (e.g., at the same time). In an example, device monitoring and response program 300 determines that user preferences 104 includes a criteria (e.g., a number of electronic devices within an identified group of electronic devices) to set a polling rate. Device monitoring and response program 300 determines that if a group of at least ten electronic devices (e.g., devices 120A-120J) are present and identified to monitored device 102, then the polling rate is set to once per six minutes. However, if device monitoring and response program 300 determines that the group of identified electronic devices includes nine or less electronic devices (e.g., devices 120D-120H) are present and identified to monitored device 102, then the polling rate is set to once per five minutes.

In another embodiment, device monitoring and response program 300 sets a polling rate based on a predefined response. In an example, if device monitoring and response program 300 determines that the weighted sum of the group of identified electronic devices (e.g., device 115, devices 120A-120N) is equal to or less than a safe-threshold value, then device monitoring and response program 300 determines that a predefined response for this safe-threshold value is increase the polling rate from once per five minutes to twice per five minutes. In some embodiments, device monitoring and response program 300 determines that user preferences 104 includes a polling rule that is variable. For example, different instances of devices 120A-120N are polled at different times as opposed to being polled at the same time.

In step 306, device monitoring and response program 300 determines which electronic devices of the group of identified devices are within an area monitored by a monitored device. In one embodiment, device monitoring and response program 300 determines which electronic devices (e.g., device 115, devices 120A-120N) of the identified group of electronic devices are within an area monitored by monitored device 102 (referencing FIG. 2, step 208) at a polling rate set in step 304. In another embodiment, device monitoring and response program 300 determines that information within user preferences 104 includes a time window for determining whether device 115 and/or one or more instances of devices 120A-120N are within a monitored area of monitored device 102. Alternatively, device monitoring and response program 300 may determine that the polling results (e.g., detection, communication) are aggregated over a period of time. In an example, device monitoring and response program 300 polls device 115 and devices 120A-120N every ten minutes; however, device 115 and devices 120A-120N are determined to be within a monitored area if device 115 and/or instances devices 120A-120N are detected within two minutes of the initiated poll. In further embodiment, device monitoring and response program 300 additionally determines a distance, relative to monitored device 102, for each of the identified electronic devices that are within a monitored area.

In step 308, device monitoring and response program 300 calculates a safe-threshold value for a monitored device. Device monitoring and response program 300 calculates a safe-threshold value for a monitored device based on which electronic devices of an identified group of electronic devices are within the monitored area. In one embodiment, device monitoring and response program 300 applies one or more weighting factors associated with each electronic device within a group of identified electronic devices that is within the monitored area and combines values to calculate a safe-threshold value. The weighting values utilized by device monitoring and response program 300 may be defined within user preferences 104. In another embodiment, device monitoring and response program 300 may determine that a weighting value may be affected by one or more user preferences. In an example, the weighting factors utilized by device monitoring and response program 300 may change based on an activity of a user. In another example, the weighting factors utilized by device monitoring and response program 300 may change based on one or more external factors, such as the time of day, received messages, and/or weather conditions.

In some embodiments, device monitoring and response program 300 calculates a safe-threshold value for monitored device 102 utilizing a summation algorithm. In one scenario, device monitoring and response program 300 applies a summation algorithm to the identified weighting factors (e.g., 1.0, 1.5, 0.5, 0.5, and 1.0) associated with the identified electronic devices detected (e.g., devices 120A, 120B, 120F, 120G, and 120H) within the defined area monitored by monitored device 102. In this instance, device monitoring and response program 300 calculates a safe-threshold value of 4.5. In another scenario, device monitoring and response program 300 may utilize an algorithm that biases a weighting factor based on the distance between an instance of devices 120A-120N and monitored device 102. In one instance, device monitoring and response program 300 proportionally biases (e.g., another weighting factor) a weighting factor based on the proximity of an instance of devices 120A-120N from the edge of the area monitored by monitored device 102. For example, device 120A is assigned a weighting factor of 1.0, and device 120A is detected at a distance 60% away from an edge of the area monitored by monitored device 102 yielding an adjusted weighting factor of 0.6. In another instance, device monitoring and response program 300 incrementally biases (e.g., −0.1 per 5 meters) a weighting factor. For example, when device 120G is detected 15 meters from monitored device 102, the effective weighting factor is 0.2 (e.g., 0.5−0.1*15/5). In other embodiments, device monitoring and response program 300 may utilize combinations of algorithms and/or mathematical methods. In an example, device monitoring and response program 300 may utilize a time based running average to calculate a safe threshold. Utilizing an algorithm based on a time averaged value as opposed to an instantaneous value may compensate for users of instances of devices 120A-120N moving into and out of an area monitored (e.g., defined) by monitored device 102, and thereby reducing false alarms (e.g., responses).

In decision step 310, device monitoring and response program 300 determines whether a calculated safe-threshold value initiates a response. In one embodiment, device monitoring and response program 300 determines that a safe-threshold value calculated for a monitored device is not achieved (e.g., equal to or less than a safe threshold), and a response is initiated (yes branch, decision step 310) based on comparing one or more safe-threshold values within user preferences 104 to a safe-threshold value calculated for a monitored area (step 308). In another embodiment, device monitoring and response program 300 determines that a safe-threshold value calculated for a monitored device is not achieved, and a response is initiated (yes branch, decision step 310) based on comparing one or more safe-threshold values obtained from device 115 to a safe-threshold value calculated for a monitored area (step 308).

In decision step 310, responsive to a determination that a safe-threshold value initiates a response (yes branch, decision step 310), device monitoring and response program 300 determines a response based on information associated with a user of a monitored device (step 312).

In step 312, device monitoring and response program 300 determines a response based on information associated with a user of a monitored device. In one embodiment, device monitoring and response program 300 determines which one or more predefined responses are selected for initiation by monitored device 102 based on information included in user preferences 104. In one scenario, device monitoring and response program 300 selects one or more predetermined responses based on a calculated safe-threshold value for a monitored area (step 308). In one instance, device monitoring and response program 300 determines which predefined response is selected based on a safe-threshold value. In another instance, device monitoring and response program 300 determines which predefined response is selected based on a logical and/or hierarchically pairing of response/safe-threshold values. In some instances, the determined responses include (e.g., cumulative) previous responses of a hierarchically paired of response/safe-threshold values. In an example, device monitoring and response program 300 may determine that a first safe-threshold value (e.g., 5.0 or less) initiates an increased polling rate for monitored device 102, a second safe-threshold value (e.g., 4.0 or less) initiates a warning signal on monitored device 102, and a third safe-threshold value (e.g., 3.0 or less) communicates a warning message (e.g., notification) to device 115. If device monitoring and response program 300 calculates a safe-threshold value of 3.5 for a monitored area, then the predefined responses for the first and second safe-threshold values are selected. In other instances, device monitoring and response program 300 may determine that multiple predefined responses are mutually exclusive and only one predefined response is initiated.

In another embodiment, device monitoring and response program 300 may include multiple criteria to determine a response for a safe-threshold value. In an instance, device monitoring and response program 300 includes the activity of a user, the knowledge of the user for the activity, external inputs (e.g., beacon information), and the safe-threshold value calculated for a monitored area to select which one or more predefined responses are selected.

In step 314, device monitoring and response program 300 initiates a determined response. In one embodiment, device monitoring and response program 300 initiates the one or more determined responses on monitored device 102.

In another embodiment, device monitoring and response program 300 may communicate a determined response to one or more other users (e.g., users of devices 120A-120N). In an example, monitored device 102 utilizes pre-analysis program 200 and device monitoring and response program 300 to monitor a group of users (e.g., tourists) that include two or more instances of devices 120A-120N. Device monitoring and response program 300 can detect when the users of the two or more instances of devices 120A-120N transit from one monitored area (e.g., 25 meter radius) to another monitored area (e.g., 40 meter radius) and transmits one message to the users within the 25 meter radius area (e.g., "Look around for your companions") and a second message to the users within the 40 meter area (e.g., "Please return to the tour group").

In step 316, device monitoring and response program 300 communicates a response to pre-analysis program 200. Device monitoring and response program 300 communicates one or determined responses for the calculated safe-threshold value to pre-analysis program 200. In one embodiment, one or more electronic devices (e.g., device 115, devices 120A-120N) may respond to one or more responses that occur on monitored device 102. In an example, monitored device 102 may initiate an inaudible alarm. Device 120F and device 120G may detect the inaudible alarm and communicate a message to the respective users of device 120F and device 120G. In another embodiment, one or more electronic devices (e.g., device 115, devices 120A-120N) may respond to a response communicated to an electronic device within the identified group of electronic devices. In an example, device 120L is not within wireless communication range of monitored device 102; however, device 115 of the identified group of electronic devices is within wireless communication range of monitored device 102. Device 115 may relay a response communicated by monitored device 102 to device 120L. Subsequently, device 120L reacts the relayed response that originated from monitored device 102.

Referring to decision step 310, responsive to a determination that a safe-threshold value does not initiates a response (no branch, decision step 310), device monitoring and response program 300 communicates a null response to pre-analysis program 200 (step 316).

Figure 4:
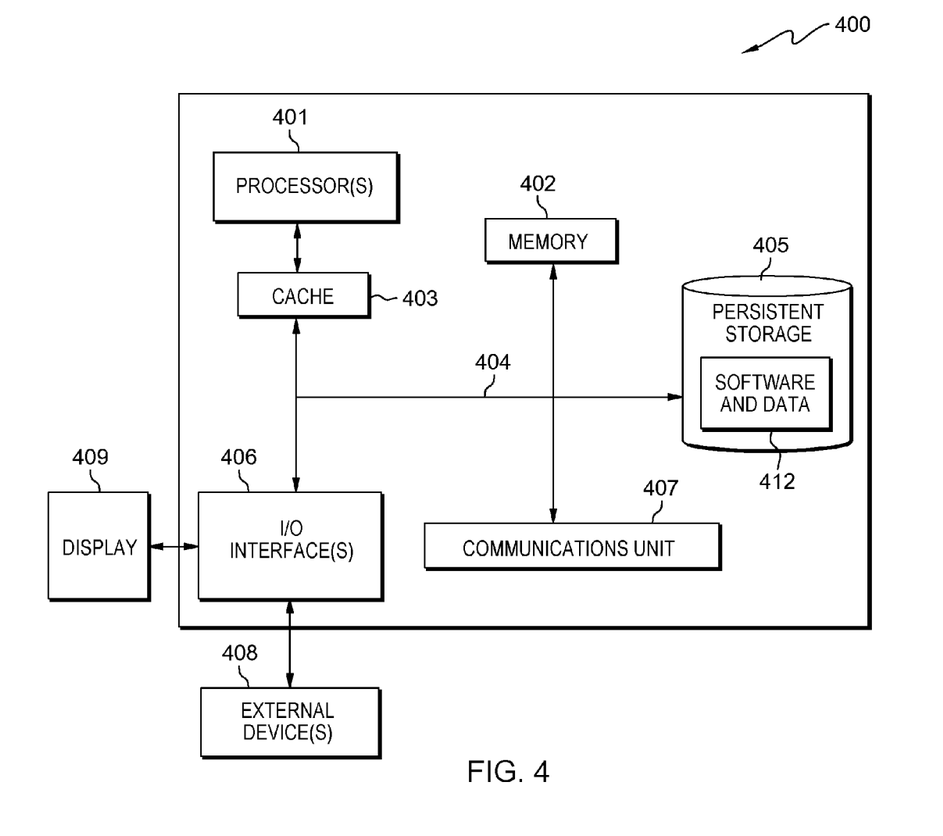
FIG. 4 is a block diagram of components of a computer, in accordance with an embodiment of the present invention.

FIG. 4 depicts computer system 400, which is representative of monitored device 102, device 115, and devices 120A-120N. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to monitored device 102, software and data 412 includes user preferences 104, UI 122, pre-analysis program 200, device monitoring and response program 300, and various programs (not shown). With respect to device 115 and devices 120A-120N, software and data 412 includes respective instances of user interface (UI) 122 and various programs (not shown).

Communications unit 407, in these examples, provides for communications with other data processing systems or devices, including resources of monitored device 102, device 115, and devices 120A-120N. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining a status of a user of an electronic device, the method comprising:
   determining, by one or more computer processors, information associated with a first user of the electronic device;
   identifying, by the one or more computer processors, a plurality of electronic devices that are within a range of wireless communication to the electronic device;
   defining, by the one or more computer processors, an area monitored by the electronic device, wherein the defined area is based, at least in part, on one or more user preferences and a value corresponding to a number of electronic devices within the identified plurality of electronic devices;
   monitoring, by the one or more computer processors, a group of the identified plurality of electronic devices that are within the defined area;
   calculating, by the one or more computer processors, a first safe-threshold value for the electronic device based on the information associated with the first user of the electronic device and monitored information from the group of the identified plurality of electronic devices, wherein calculating the first safe-threshold value further comprises:
      determining electronic devices included in the group of the identified plurality of electronic devices that are within the defined area monitored by the electronic device, wherein determining occurs periodically based, at least in part, on a polling rate of the electronic device;
      determining one or more weighting factors respectively associated with each determined electronic device of the identified group of the identified plurality of electronic devices; and
      calculating the first safe-threshold value based on an algorithm that includes:
         one or more weighting factors respectively associated with each determined electronic device of the group of the identified plurality of electronic devices;
         an activity of the first user;
         the information associated with the first user; and
         a degree of familiarity for the activity by the first user; and
   determining, by the one or more computer processors, the status for the first user based, at least in part, on the calculated first safe-threshold value for the electronic device, wherein determining the status of the first user further comprises:
   determining a second safe-threshold value for the first user based, at least in part, on:
      the one or more user preferences, wherein user preferences includes preferences of the first user;
      a number of electronic devices within the identified plurality of electronic devices;
      the activity of the first user;
      the information associated with the first user;
      the degree of familiarity for the activity by the first user; and
   comparing the first safe-threshold value to the second safe-threshold value; and
   in response to determining that the first safe-threshold value is greater than the second safe-threshold value for the first user, determining, by the one or more computer processors, that the status of the first user is safe; and
   in response to determining that the status of the first safe-threshold value is less than or equal to the second safe-threshold value for the first user determining that the status of the first user is not safe, initiating, by the one or more computer processors, one or more responses of the electronic device based, at least in part, the one or more user preferences.

* * * * *